(12) United States Patent
Buchalter et al.

(10) Patent No.: US 8,126,629 B2
(45) Date of Patent: Feb. 28, 2012

(54) METHOD AND SYSTEM FOR OPERATING GAS TURBINE ENGINE SYSTEMS

(75) Inventors: Lauren Jeanne Buchalter, Taylors, SC (US); Bryan Edward Sweet, Valatie, NY (US); Scott William Szepek, Glenville, NY (US); Michael John Mariani, Greer, SC (US)

(73) Assignee: General Electric Company, Schenectady, NY (US)

( * ) Notice: Subject to any disclaimer, the term of this patent is extended or adjusted under 35 U.S.C. 154(b) by 1181 days.

(21) Appl. No.: 12/109,869

(22) Filed: Apr. 25, 2008

(65) Prior Publication Data
US 2009/0271085 A1    Oct. 29, 2009

(51) Int. Cl.
*G06F 19/00* (2006.01)
(52) U.S. Cl. .......... 701/100; 701/99; 123/456; 123/520; 123/439; 123/514; 261/79.1; 261/53
(58) Field of Classification Search .................... 431/10; 123/439, 520, 549, 375; 428/116; 261/53; 60/251; 701/99–100
See application file for complete search history.

(56) References Cited

U.S. PATENT DOCUMENTS

| | | | |
|---|---|---|---|
| 5,457,625 A | 10/1995 | Lim et al. | |
| 6,226,974 B1 | 5/2001 | Andrew et al. | |
| 6,526,358 B1 * | 2/2003 | Mathews et al. | 702/51 |
| 6,823,253 B2 | 11/2004 | Brunell | |
| 6,823,675 B2 | 11/2004 | Brunell et al. | |
| 7,219,040 B2 | 5/2007 | Renou et al. | |
| 7,269,953 B2 | 9/2007 | Gadde et al. | |
| 7,363,094 B2 | 4/2008 | Kumar | |
| 7,493,767 B2 * | 2/2009 | Bunker et al. | 60/752 |
| 7,859,008 B2 * | 12/2010 | D'Evelyn et al. | 257/103 |

* cited by examiner

*Primary Examiner* — Thomas Black
*Assistant Examiner* — Luke Huynh
(74) *Attorney, Agent, or Firm* — Armstrong Teadale LLP (57) ABSTRACT

Methods and systems for operating a gas turbine engine system are provided. The system includes a gas turbine engine that includes at least one combustor configured to receive a flow of fuel from a flow control device and a fuel control system. The fuel control system includes a piping system configured to channel the flow of fuel from a fuel source to the flow control device, a sensor configured to generate a signal indicative of a property of the flow of fuel wherein the property of the flow of fuel is variable over time, and a controller including a processor. The processor is programmed to receive the generated signal, using a flow model of the piping system and the received signal, iteratively track the progress of a plurality of discrete volumes flowing through the piping system, and control the flow of fuel using the flow control devices.

19 Claims, 7 Drawing Sheets

METHOD AND SYSTEM FOR OPERATING GAS TURBINE ENGINE SYSTEMS

BACKGROUND OF THE INVENTION

This invention relates generally to gas turbine engines, and more particularly, to methods and apparatus for controlling the operation of gas turbine engines.

Gas turbine engines typically include a compressor section, a combustor section, and at least one turbine section. The compressor compresses air, which is mixed with fuel and channeled to the combustor. The mixture is then ignited generating hot combustion gases. The combustion gases are channeled to the turbine, which extracts energy from the combustion gases for powering the compressor, as well as producing useful work to power a load, such as an electrical generator, or to propel an aircraft in flight.

Gas turbine engines operate in many different operating conditions, and combustor performance facilitates engine operation over a wide range of engine operating conditions. Controlling combustor performance may be used to improve overall gas turbine engine operations. More specifically, permitting a larger variation in gas fuel composition, for example, heating value and specific gravity, while maintaining $NO_x$ emissions and combustion dynamics levels within predetermined limits. Gas turbines equipped with Dry Low $NO_x$ (DLN) combustion systems typically utilize fuel delivery systems that include multi-nozzle, premixed combustors. DLN combustor designs utilize lean premixed combustion to achieve low $NO_x$ emissions without using diluents such as water or steam. Lean premixed combustion involves premixing the fuel and air upstream of the combustor flame zone and operation near the lean flammability limit of the fuel to keep peak flame temperatures and $NO_x$ production low. To deal with the stability issues inherent in lean premixed combustion and the wide fuel-to-air ratio range that occurs across the gas turbine operating range, DLN combustors typically have multiple fuel nozzles in each combustion chamber that are fueled individually or in sub-groups. The gas turbine fuel system has a separately controlled delivery circuit to supply each group of nozzles in each chamber. The control system varies the fuel flow (fuel split) to each circuit over the turbine operating range to maintain flame stability, low emissions, and acceptable combustor life. Fuel flow to each nozzle sub-group is controlled via a gas control valve (GCV). The fuel split acts to divide the total fuel command (Fuel Stroke Reference) amongst the active GCV's, and the resulting percentage GCV fuel flow command is converted to a valve position to achieve the desired fuel flow to the nozzle sub-group.

Many discrete control systems use third or private party software interface programs to structure and create executable software code. These software interfaces can limit the software structure flexibility, are generally more focused on Boolean or logic based software strategies, and often are not suited for nested loop or matrix-based software. Some digital control system platforms do not directly allow loop (if, while, etc) based software, and do not allow for dynamically expandable matrices, therefore all matrix dimensions specified at variable creation are fixed. Such restrictions create several challenges when implementing an iterative matrix based fluid system flow model.

BRIEF DESCRIPTION OF THE INVENTION

In one embodiment, a gas turbine engine system includes a gas turbine engine that includes at least one combustor configured to receive a flow of fuel from a flow control device and a fuel control system. The fuel control system includes a piping system configured to channel the flow of fuel from a fuel source to the flow control device, a sensor configured to generate a signal indicative of a property of the flow of fuel wherein the property of the flow of fuel is variable over time, and a controller including a processor. The processor is programmed to receive the generated signal, using a flow model of the piping system and the received signal, iteratively track the progress of a plurality of discrete volumes flowing through the piping system, and control the flow of fuel using the flow control devices.

In another embodiment, a computer-implemented method of operating a gas turbine engine having a fuel control system including a piping system and a fuel flow control device is provided. The method includes receiving a signal indicative of a property of a flow of fuel at an inlet to the piping system, modeling at least a portion of the piping system using a one-dimensional matrix, determining a property of the flow of fuel at the flow control device using the received signal and the model, and automatically controlling at least one of a flow of fuel and a fuel split using the determined property.

In yet another embodiment, a fuel control system includes a fuel inlet configured to admit a flow of fuel into the fuel control system, a fuel piping system coupled in flow communication with the fuel inlet, and at least one flow control device configured to modulate flow to one or more injection points in a fuel control system load, the at least one flow control device coupled in flow communication with the fuel inlet through the fuel piping system. The fuel control system also includes an input device configured to transmit a signal indicative of a property of a flow of fuel entering the fuel inlet and a controller programmed to scan a plurality of logic circuits at a predetermined scan rate. The controller is further programmed to receive a signal from the input device indicative of a property of the flow of fuel, using a flow model including a plurality of one-dimensional matrices and the transmitted signal, track the progress of the flow of fuel through the fuel piping system in real time, and automatically control at least one of the low of fuel and a fuel split using the tracked flow of fuel to facilitate permitting a relatively large variation in the fuel property.

BRIEF DESCRIPTION OF THE DRAWINGS

FIGS. 1-8 show exemplary embodiments of the method and system described herein.

DETAILED DESCRIPTION OF THE INVENTION

While the methods and apparatus are herein described in the context of a gas turbine engine used in an industrial environment, it is contemplated that the method and apparatus described herein may find utility in other combustion turbine systems applications including, but not limited to, turbines installed in aircraft and marine vessels. In addition, the principles and teachings set forth herein are applicable to gas turbine engines using a variety of combustible fuels such as, but not limited to, natural gas, liquefied natural gas, gasoline, kerosene, diesel fuel, and jet fuel. The description herein below is therefore set forth only by way of illustration, rather than limitation.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
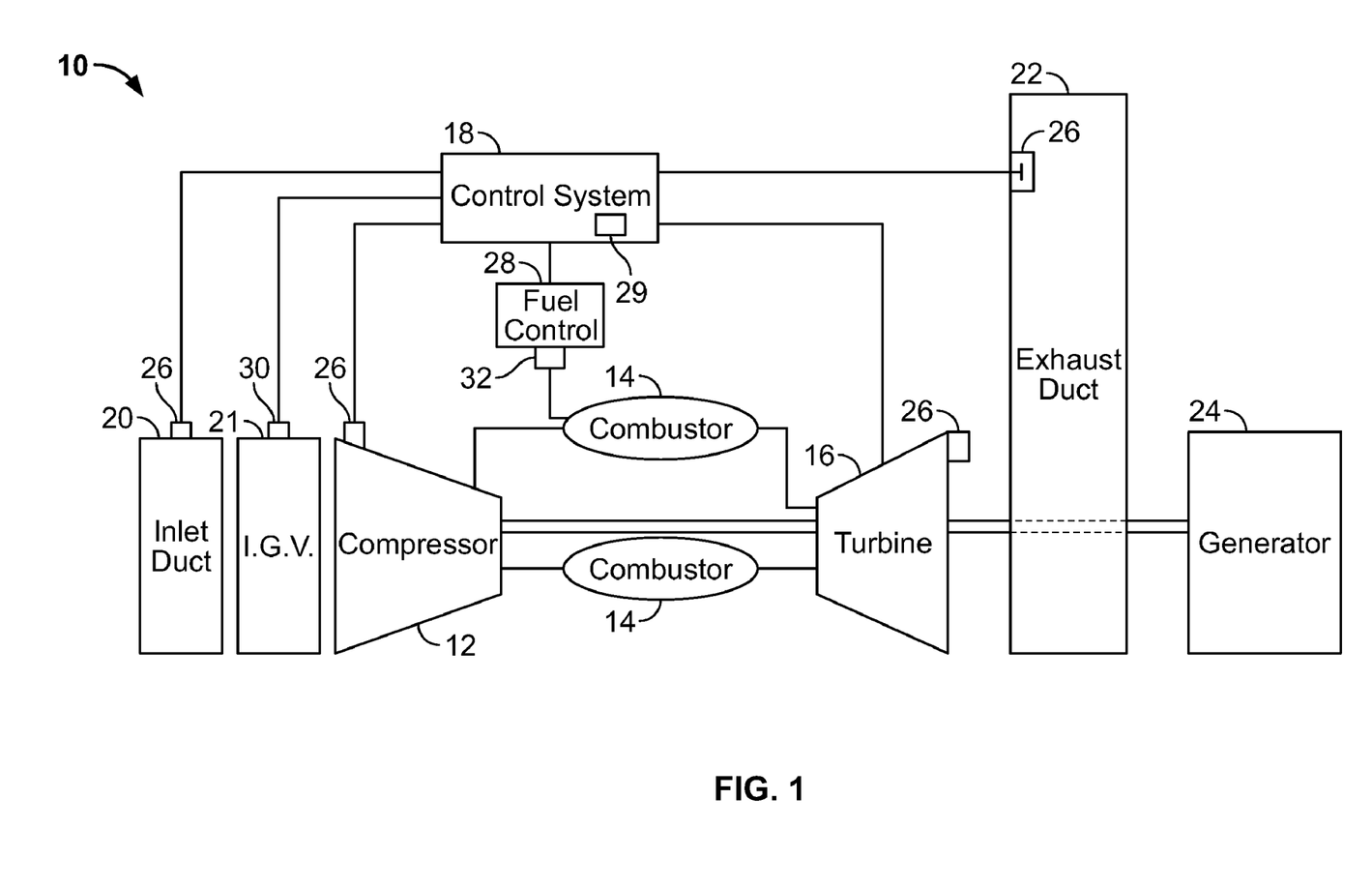
FIG. 1 is a schematic diagram of a gas turbine engine system in accordance with an embodiment of the present invention.

FIG. 1 is a schematic diagram of a gas turbine engine system 10 including a compressor 12, a combustor 14, a turbine 16 drivingly coupled to compressor 12, and a control system 18. An inlet duct 20 channels ambient air to the compressor. In one embodiment, injected water and/or other humidifying agent is also channeled to the compressor through inlet duct 20. Inlet duct 20 may have ducts, filters, screens and sound absorbing devices that contribute to a pressure loss of ambient air flowing through inlet duct 20 into one or more inlet guide vanes 21 of compressor 12. An exhaust duct 22 channels combustion gases from an outlet of turbine 16 through, for example, emission control and sound absorbing devices. Exhaust duct 22 may include sound adsorbing materials and emission control devices that apply a backpressure to turbine 16. The amount of inlet pressure loss and back pressure may vary over time due to the addition of components to ducts 20, 22, and to dust and dirt clogging the inlet and exhaust ducts. Turbine 16 may drive a generator 24 that produces electrical power. The inlet loss to compressor 12 and turbine exhaust pressure loss tend to be a function of corrected flow through the gas turbine. Further, the amount of inlet loss and turbine back-pressure may vary with the flow rate through the gas turbine.

The operation of the gas turbine engine system 10 may be monitored by several sensors 26 detecting various conditions of turbine 16, generator 24, and ambient environment. For example, temperature sensors 26 may monitor ambient temperature surrounding gas turbine engine system 10, compressor discharge temperature, turbine exhaust gas temperature, and other temperature measurements of the gas stream through the gas turbine engine. Pressure sensors 26 may monitor ambient pressure, and static and dynamic pressure levels at the compressor inlet and outlet, turbine exhaust, at other locations in the gas stream through the gas turbine.

Humidity sensors 26, such as wet and dry bulb thermometers, measure ambient humidity in the inlet duct of the compressor. Sensors 26 may also comprise flow sensors, speed sensors, flame detector sensors, valve position sensors, guide vane angle sensors and other sensors that sense various parameters relative to the operation of gas turbine engine system 10. As used herein, "parameters" refer to physical properties whose values can be used to define the operating conditions of gas turbine engine system 10, such as temperatures, pressures, and gas flows at defined locations.

A fuel control system 28 regulates the fuel flowing from a fuel supply to combustor 14, and the split between the fuel flowing into various fuel nozzles located about the combustion chamber. Fuel control system 28 may also select the type of fuel for the combustor. The fuel control system 28 may be a separate unit or may be a component of control system 18. Fuel control system 28 may also generate and implement fuel split commands that determine the portion of fuel flowing to fuel nozzle subgroups.

Control system 18 may be a computer system having a processor(s) 29 that executes programs to control the operation of the gas turbine using sensor inputs and instructions from human operators. The programs executed by the controller 18 may include scheduling algorithms for regulating fuel flow to combustor 14. The commands generated by the controller cause actuators on the gas turbine to, for example, adjust valves (actuator 32) between the fuel supply and combustors that regulate the flow, fuel splits and type of fuel flowing to the combustors; adjust inlet guide vanes 21 (actuator 30) on the compressor, and activate other control settings on the gas turbine.

Control system 18 regulates the gas turbine based, in part, on algorithms stored in computer memory of the controller. These algorithms enable control system 18 to maintain the $NO_x$ and CO emissions in the turbine exhaust to within certain predefined emission limits, and to maintain the combustor firing temperature to within predefined temperature limits. The algorithms have inputs for parameter variables for current compressor pressure ratio, ambient specific humidity, inlet pressure loss and turbine exhaust backpressure. Because of the parameters in inputs used by the algorithms, control system 18 accommodates seasonal variations in ambient temperature and humidity, and changes in the inlet pressure loss through the inlet 20 of the gas turbine and in the exhaust back pressure at the exhaust duct 22. Input parameters for ambient conditions, and inlet pressure loss and exhaust back pressure enable $NO_x$, CO and turbine firing algorithms executing in control system 18 to automatically compensate for seasonal variations in gas turbine operation and changes in inlet loss and in back pressure. Accordingly, the need is reduced for an operator to manually adjust a gas turbine to account for seasonal variations in ambient conditions and for changes in the inlet pressure loss or turbine exhaust back pressure.

The combustor 14 may be a DLN combustion system. Control system 18 may be programmed and modified to control the DLN combustion system and for determining fuel splits.

The schedules and algorithms executed by control system 18 accommodate variations in ambient conditions (temperature, humidity, inlet pressure loss, and exhaust backpressure) that affect $NO_x$, combustor dynamics, and firing temperature limits at part-load gas turbine operating conditions. Control system 18 simultaneously schedules exhaust temperature and combustor fuel splits. Control system 18 applies algorithms for scheduling the gas turbine, such as setting desired turbine exhaust temperatures and combustor fuel splits, so as to satisfy performance objectives while complying with operability boundaries of the gas turbine. Control system 18 simultaneously determines level combustor temperature rise and $NO_x$ during part-load operation in order to increase the operating margin to the combustion dynamics boundary and thereby improve operability, reliability, and availability of the gas turbine.

The combustor fuel splits are scheduled by control system 18 to maintain the desired combustion mode while observing other operability boundaries, such as combustion dynamics. At a given load level, the cycle match point and the combustor fuel splits influence the resultant $NO_x$ emissions. Simultaneously leveling $NO_x$ and combustor temperature rise during part-load operation minimizes the level of combustion dynamics and expands the operational envelope of the gas turbine without adversely impacting emissions compliance or parts life.

Combustors 14 include a plurality of fuel control valves supplying two or more injector groups in each combustor to allow modulation of modes of operation, emissions, and combustion dynamics levels versus machine load. By modulating fuel splits among the several fuel gas control valves, emissions and dynamics are optimized over the machine load range. Fuel split modulation depends on a calculated reference parameter, called combustion reference temperature, which is a function of machine exhaust temperature and other continuously monitored machine parameters.

Embodiments the invention descried herein define a method and control system to manage the fuel flow to a combustion system in for example, a combined cycle power plant of varying fuel composition and heating value. A method of controlling fuel flow that permits smooth transitions when fuel property changes are significant is used to minimize disturbances to the electrical grid as well as maintain stack emissions within predetermined limits. Fuel moisturization systems are employed to improve overall combined cycle performance of the power plant. A method of compensating for fuel composition changes resulting from humidification of the fuel is used to facilitate combustion system operation under fault conditions of the moisturization system as well as during normal startup and loading operation of the combined power plant. A large change in fuel composition and/or heating value could result in combustor flame stability issues such as loss of flame or excessive temperature and could cause the generating unit to trip off line.

A flow model is used to determine the appropriate timing for adjustment of the fuel system flow because devices used to measure fuel composition and moisture content are typically only available well upstream of the gas control valve. To appropriately control fuel to the combustion system, the physical properties of the fuel at the main fuel control elements, the fuel gas control valves, must be known. For fuels that vary little in composition, the physical properties are assumed constant and measured parameters such as pressure and temperature are used to appropriately control fuel delivery to the gas turbine. However, in situations where the fuel composition and corresponding physical properties vary significantly this assumption is no longer valid, and the gas turbine fuel control is programmed to track such variations from their point of detection until they enter the fuel gas control valves or combustor and to adjust fuel flow to account for such variations.

Combustion systems that utilize fuel moisturization experience periods of fuel composition variation during normal loading/unloading as well as during moisturization tower restarts after system upsets or trip conditions. During normal loading and unloading, moisture is added to the fuel gas to optimize the combined cycle performance when sufficient energy is available in the bottoming cycle and conditions are favorable in the combustion system. The addition of moisture to the fuel changes the physical properties substantially, and as a result the fuel control must make necessary adjustments to either the fuel command or the fuel system flow gain.

Because measurement of the moisturized gas physical properties at the gas control valve/s (GCV's) is not practical, the fluid flow model is utilized to predict the fuel properties at the inlet of the GCV's. The flow model tracks the water vapor content within the system and predicts the physical transport delay of the moisturized gas through the system. The water vapor mole fraction calculated at the fuel moisturization tower exit is used in the flow model to calculate the amount of water vapor in the natural gas/water vapor mixture throughout the system and ultimately at the inlet of the GCV's continuously in time. The water vapor mole fraction modeled at the GCV's is then used in the flow gain adjustment calculations to re-linearize the fuel command and minimize load transients during fuel moisturization transfers.

Figure 2:
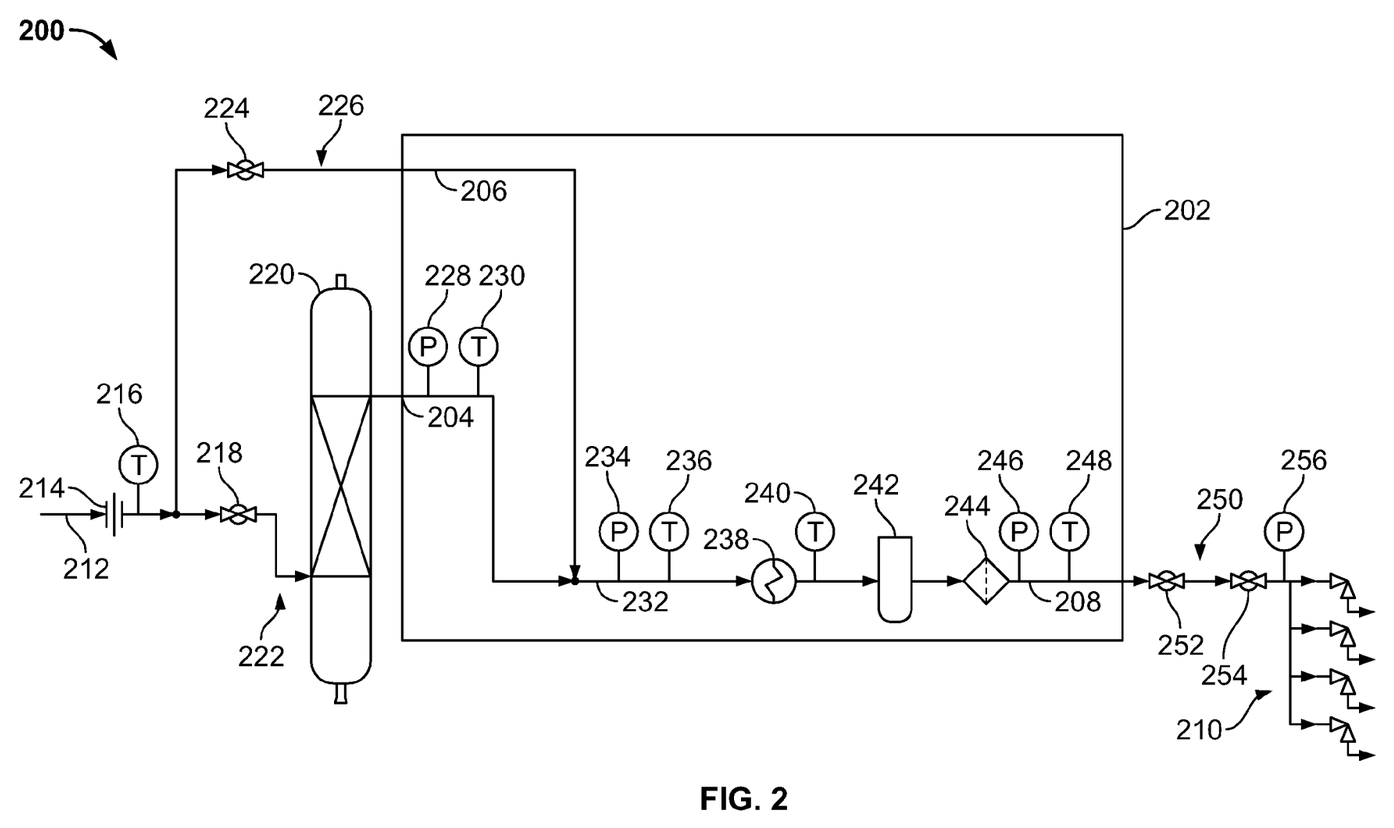
FIG. 2 is a schematic diagram of an exemplary fuel system flow network that may be used with the system shown in FIG. 1.

FIG. 2 is a schematic diagram of an exemplary fuel system flow network 200 in accordance with an embodiment of the present invention. In the exemplary embodiment, a control volume of interest 202 includes a first inlet flow stream 204, a second inlet flow stream 206, and a single outlet stream 208 feeding one or more gas control valves 210. An inlet fuel header 212 includes a flow orifice 214 and a temperature sensor 216. Header 212 supplies a tower inlet control valve 218 and a fuel moisturization tower 220 through a first branch 222 and supplies a tower bypass control valve 224 through a second branch 226. First inlet flow stream 204 includes pressure and temperature sensors, 228, and 230, respectively. First inlet flow stream 204 and second inlet flow stream 206 combine at a common fuel header 232. In the exemplary embodiment, common fuel header 232 includes in serial flow relationship, a pressure sensor 234, a temperature sensor 236, a performance heater 238, a temperature sensor 240, a scrubber 242, a strainer 244, a pressure sensor 246, and a temperature sensor 248. An outlet fuel header 250 includes an auxiliary stop valve 252, a safety relief valve 254, a pressure sensor 256, and one or more gas control valves 210.

To accurately control fuel delivery to the combustion system the physical properties of the fuel at the main fuel control elements such as gas control valves 210 should be known. For fuels that vary little in composition, the fuel constituents and physical properties may be assumed to be constant and physical parameters such as pressure and temperature may be used to control fuel to the gas turbine. In some cases, the physical properties of the fuel may vary significantly resulting in such assumptions being erroneous or inaccurate.

In some combustion systems that utilize fuel moisturization systems, the physical properties of the fuel may vary significantly during normal loading/unloading as well as restart following a system upset or during trip conditions. During normal loading and unloading moisture is added to the fuel gas for combined cycle performance benefits when sufficient energy is available in the bottoming cycle and conditions are favorable in the combustion system. The addition of moisture to the fuel changes the physical properties substantially, and as a result the fuel control system is tasked with making corresponding adjustments to either the fuel command or the fuel system flow gain accordingly.

When physical property measurement is neither available between the moisturization tower and the gas control valve/s (GCV's) nor practical to measure continuously, a physical flow model is utilized to predict the fuel properties at the inlet of the GCV. The flow model represents the water vapor content and the physical transport delay of the fluid through the system. An assumption may be made that no additional natural gas fuel or water is added to the fluid stream downstream of the fuel moisturization tower. The water vapor mole fraction calculated at the fuel moisturization tower exit is fed to the flow model, and then calculated at the gas control valve inlet continuously based on the boundary conditions in the system. The physical properties exiting the tower can be measured as water added to the dry natural gas inlet fuel and at the subsequent physical properties at the GCV will be determined based on, but not limited to, the mixture temperature, pressure, flow velocity, and volumes in the system. The water vapor mole fraction calculated at the GCV is then used in the physical property calculations that follow to appropriately adjust the flow gain to re-linearize the fuel command and minimize load transients that would have occurred during the transfer without the adjustment.

The control system utilizes the flow model to appropriately time the flow gain adjustment which uses the physical properties of the fuel at the gas control valve inlet to correct for the expected changes that can result from the changing physical properties.

It is particularly important in gas turbine combustion systems to maintain proper fuel control. Gas turbines equipped with Dry Low $NO_x$ (DLN) combustion systems typically utilize fuel delivery systems that include multi-nozzle, pre-mixed combustors. DLN combustor designs utilize lean premixed combustion to achieve low $NO_x$ emissions without using diluents such as water or steam. Lean premixed combustion involves premixing the fuel and air upstream of the combustor flame zone and operation near the lean flammability limit of the fuel to keep peak flame temperatures and $NO_x$ production low. To deal with the stability issues inherent in lean premixed combustion and the wide fuel-to-air ratio range that occurs across the gas turbine operating range, DLN combustors typically have multiple fuel nozzles in each combustion chamber that are fueled individually or in sub-groups. The gas turbine fuel system has a separately controlled delivery circuit to supply each group of nozzles in each chamber. The control system will vary the fuel flow (fuel split) to each circuit over the turbine operating range to maintain flame stability, low emissions, and acceptable combustor life. Fuel flow to each nozzle sub-group is controlled via a gas control valve (GCV). The fuel split acts to divide the total fuel command (Fuel Stroke Reference) amongst the active GCV's, and the resulting percentage GCV fuel flow command must be converted to a valve position to achieve the desired fuel flow to the nozzle sub-group.

Figure 3:
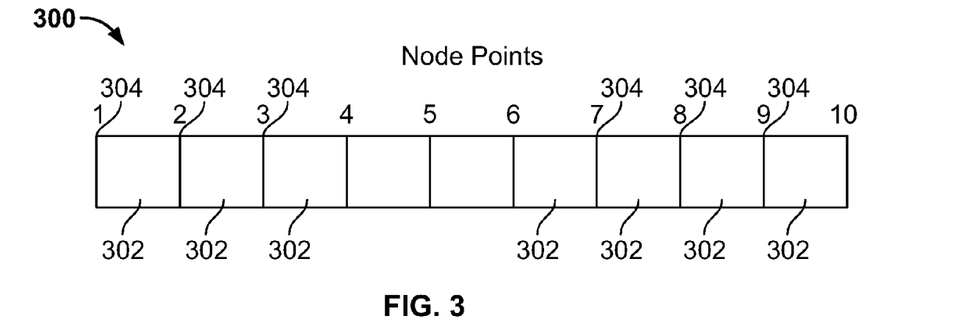
FIG. 3 is a schematic view of a control volume model that may be used in an exemplary embodiment of the present invention.

FIG. 3 is a schematic view of a control volume model 300 that may be used in an exemplary embodiment of the present invention. In the exemplary embodiment, control volume model 300 is divided into a plurality of equally spaced elements 302 by node points 304. Control volume model 300 is used in a software-based method used in a digital control system to actively model a fluid flow and composition in a control volume discretely in time. The inputs into the flow model include fluid density, composition, flow rate, and the time step or model mesh size. The model then creates a 1-D map of the system, which is updated every time step interval. The number of node points needed to fully model the control volume, or the model mesh size is determined by, for example, the model time step, and minimum fluid flow rate.

The fluid flow model can be applied in digital controls systems where real time measurement of process variables is not practical. The fluid flow model can then be used to predicatively control to actual real-time operating conditions. For example, fuel composition can vary during turbine operation due to changes in the supply source, operation conditions (pressure, temperature), power augmentation (water/steam injection) or by some other means. In these cases, a strategy of actively controlling fuel flow is required to minimize disturbances to the electrical grid as well as maintain stack emissions within acceptable limits when large fuel composition changes occur. Without correction, large changes in fuel composition and/or heating value inevitably result in combustor flame stability issues such as loss of flame or excessive temperature and could cause the generating unit to trip off line. This invention is used in a gas turbine application to model the composition of moisturized gas fuel transiently in a piping system, to actively correct fuel control parameters correctly in real time.

Flow Model Equations

The fluid flow model includes algorithms based in part on fluid dynamics. For example, the Reynolds transport theorem evaluated for the conservation of mass of a steady flow in a control volume yields the following equation, which states that the mass flow rates into and out of a control volume are equal.

$$\Sigma(\rho_i A_i V_i)_{out} = \Sigma(\rho_i A_i V_i)_{in}, \text{ where} \quad (1)$$

$\rho$=Density of fluid
A=Cross-sectional area
V=System control volume

Equation (1) can be further simplified, if the fluid behaves as an incompressible fluid with little to no significant density variations to yield:

$$\Sigma(Q_i)_{out} = \Sigma(Q_i)_{in}, \text{ where} \quad (2)$$

Q=Volumetric flow rate of the fluid.

Equations (1) and (2) can be used in a fluid flow model to characterize the physical composition of a fluid in any given control volume providing that the fluid flow is steady, $\partial \rho / \partial t = 0$, mass sources or sinks within the control volume are negligible, and if assumed incompressible, the density of the fluid is constant throughout the control volume.

The number of node points 304 needed to fully model the control volume, or the model mesh size is determined by the model time step, and minimum fluid flow rate in accordance with the following equation:

$$\#\text{Elements} = (V_{tot} / Q_{min} * \Delta t), \text{ where} \quad (3)$$

$Q_{min}$=Min possible volumetric flow rate of the fluid, [ft3/sec]
$V_{tot}$=Total control system volume, [ft3]
$\Delta t$=Model time step, [sec]

The accuracy of the model depends on the size of the flow model mesh elements. In some applications, the software framework environment limits the size of a matrix and/or requires the size of a matrix to remain constant once defined. In these cases, the boundary and property matrices are defined so that they contain at least the minimum number of elements as determined by the equation above.

Once the model mesh size is determined, the flow in the control volume can be simplified to a 1-D pipe flow with a constant cross-sectional area. This simplification allows each discrete fluid element to be modeled and updated uniformly each time step using 1-D matrices. The steps used to create and update the 1-D matrix flow model each time step $\Delta t$ includes a linear distance traveled calculation, a boundary matrix update, a boundary matrix shift, and a property matrix update.

Linear Distance Traveled Calculation

Given an initially empty control volume starting condition, the boundary and property matrices are initialized to zero. For each model time step, the current system mass flow or volumetric flow rate is computed, and used to determine the equivalent linear distance traveled through the flow model 1-d pipe using:

$$\text{dist} = (Q(dt) * \Delta t / A_c), \text{ where} \qquad (4)$$

Q(dt)=Volumetric flow rate of the fluid at given time step, [ft3/sec]
$A_c$=System model cross-sectional area, [ft2]
$\Delta t$=Model time step, [sec]

Figure 4A:
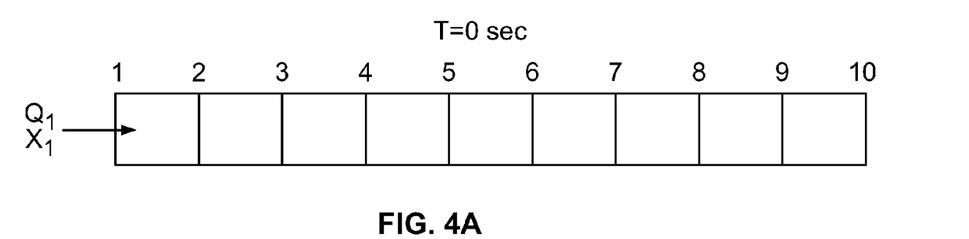
FIG. 4A is a schematic view of control volume model 300 at a first time step increment assuming an inlet volumetric flow of Q1.
Figure 4B:
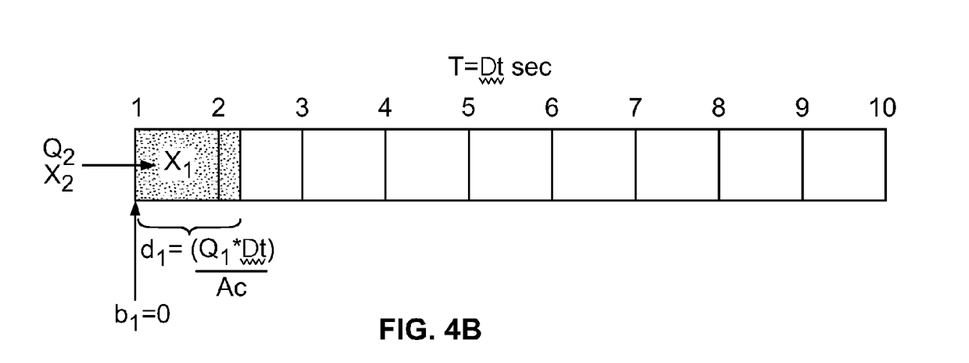
FIG. 4B is a schematic view of control volume model 300 at a second time step increment assuming an inlet volumetric flow of Q2.
Figure 4C:
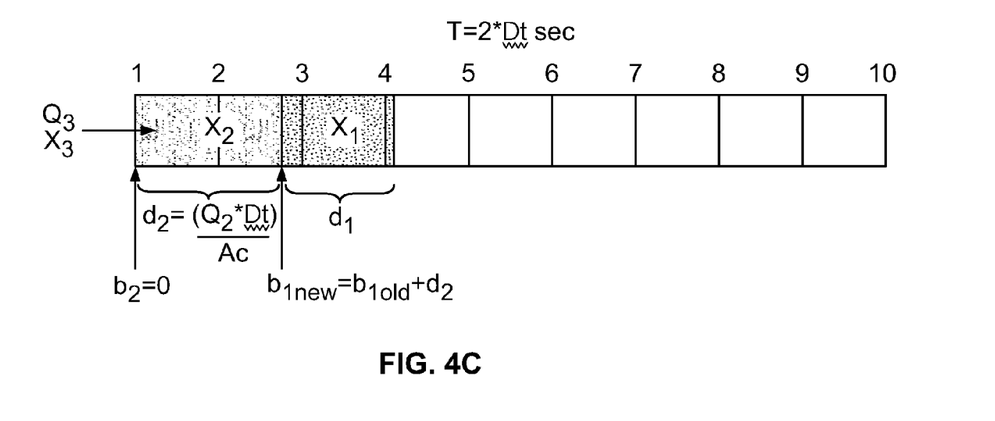
FIG. 4C is a schematic view of control volume model 300 at a third time step increment assuming an inlet volumetric flow of Q3.

FIG. 4A is a schematic view of control volume model 300 at a first time step increment assuming an inlet volumetric flow of Q1. FIG. 4B is a schematic view of control volume model 300 at a second time step increment assuming an inlet volumetric flow of Q2. FIG. 4C is a schematic view of control volume model 300 at a third time step increment assuming an inlet volumetric flow of Q3.

Boundary Matrix Update

Once the linear traveled distance is calculated, each boundary in the boundary matrix is updated or shifted in the pipe by incrementing each boundary value by the linear traveled distance. This process is repeated for each model time step. The mass or volumetric flow rate is assumed to remain constant during a time step and is only updated after a full time step.

In FIG. 4A fluid has not entered the pipe and a first fluid element X1 is shown outside control volume model 300. An elemental fluid boundary is defined as the left most or last point for any given fluid element X. In FIG. 4B, after the first time increment of $\Delta t$ seconds, boundary b1 of fluid element X1 is equal to zero and a rightmost edge of first property element X1 is shown a distance d1 from boundary b1. In FIG. 4C, after a second time increment has lapsed, boundary b1 of fluid element X1 has advanced through the model a distance given by. An elemental fluid boundary b2 is equal to zero.

Boundary Matrix Shift:

An elemental fluid boundary is defined as the left most or last point for any given fluid element. This means that the first boundary element in the boundary array must always equal zero. Because the boundary matrix is first updated by adding the linear distance traveled, the boundary matrix must then be shifted down by one element, and a zero inserted for the first element.

Similarly, the fluid property matrix is updated by shifting each element down in the array. If the software environment does not allow matrices to be actively re-sized, then the last element in model boundary and property matrices must be dropped during the matrix shift step.

Property Matrix Update:

The last step in the flow model loop is to update the fluid property matrix. The fluid flow models are used to track a physical property of the fluid in real time. For example, in a gas turbine system that uses a gas fuel moisturization system, which adds water to the fuel for power augmentation. The system transitions between a dry natural gas to the moisturized fuel during the loading cycle. To avoid fluctuations in turbine power output as a result of lower heating value moist fuel, the fuel flow model is used to track the concentration of the fuel water mixture to predict the concentration of fuel being burned real-time by the gas turbine combustion system. In the property matrix update, the current fluid property at the inlet to the control volume is inserted as the first element in the property matrix array.

Figure 5A:
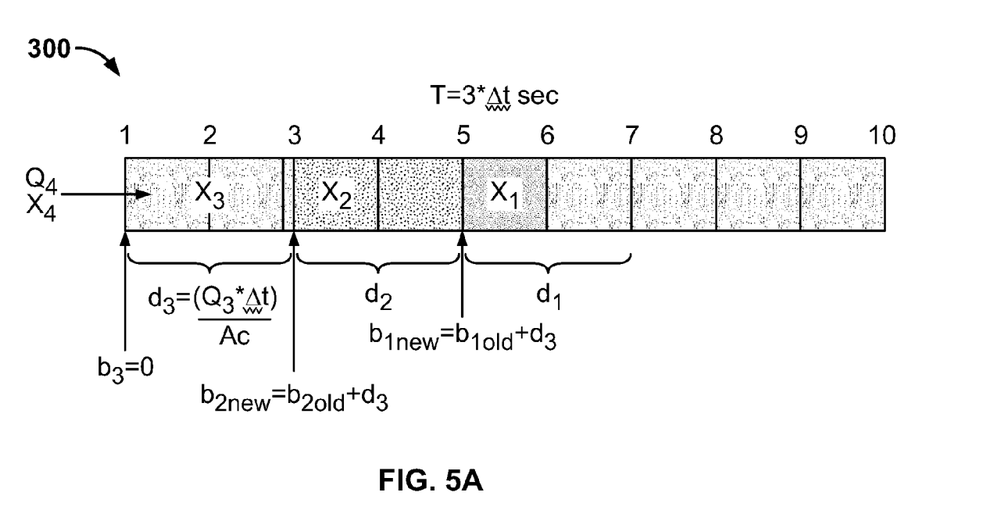
FIG. 5A is a schematic view of control volume model 300 at a fourth time step increment assuming an inlet volumetric flow of Q4.
Figure 5B:
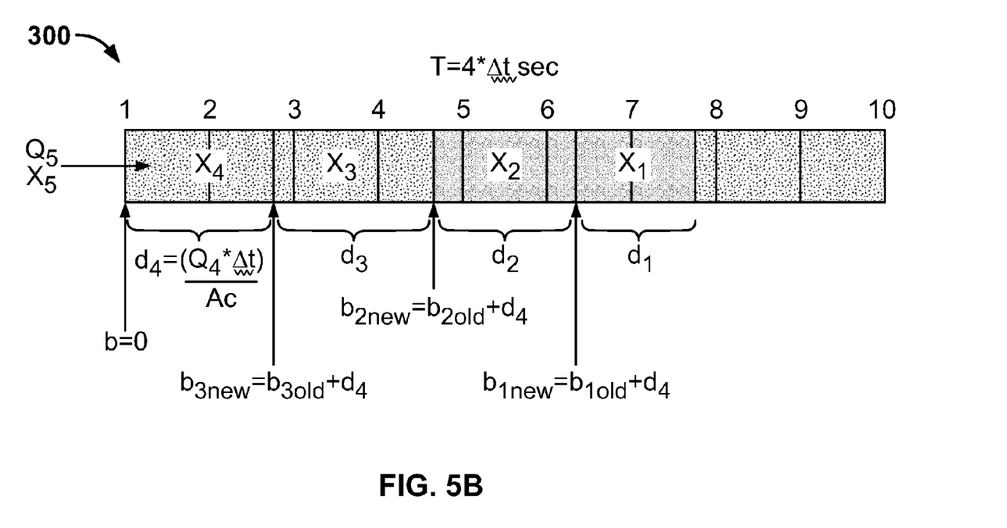
FIG. 5B is a schematic view of control volume model 300 at a fifth time step increment assuming an inlet volumetric flow of Q5.

FIGS. 5A and 5B are schematic views of control volume model 300 illustrating the fourth and fifth time step graphically to further illustrate how the flow model is updated. FIG. 5A is a schematic view of control volume model 300 at a fourth time step increment assuming an inlet volumetric flow of Q4. FIG. 5B is a schematic view of control volume model 300 at a fifth time step increment assuming an inlet volumetric flow of Q5.

The output of the fluid flow model for each time step can be used to determine the physical properties of the fluid at any location in the control volume. The fluid properties at a fixed physical location can be determined by calculating the equivalent 1-D linear length of the fixed location according to the equation:

$$\text{dist} = (V_{fixed}/A_c), \text{ where} \qquad (5)$$

$A_c$=System model cross-sectional area, [ft2]
$V_{fixed}$=Volume before fixed location, [ft3]

Once the linear distance is known, the fluid property at that location can be determined by finding the first boundary matrix element greater than the calculated linear distance. If that index is equal to i, then the property of the fluid at that given time step at the fixed location is equal to p[i−1].

Figure 6:
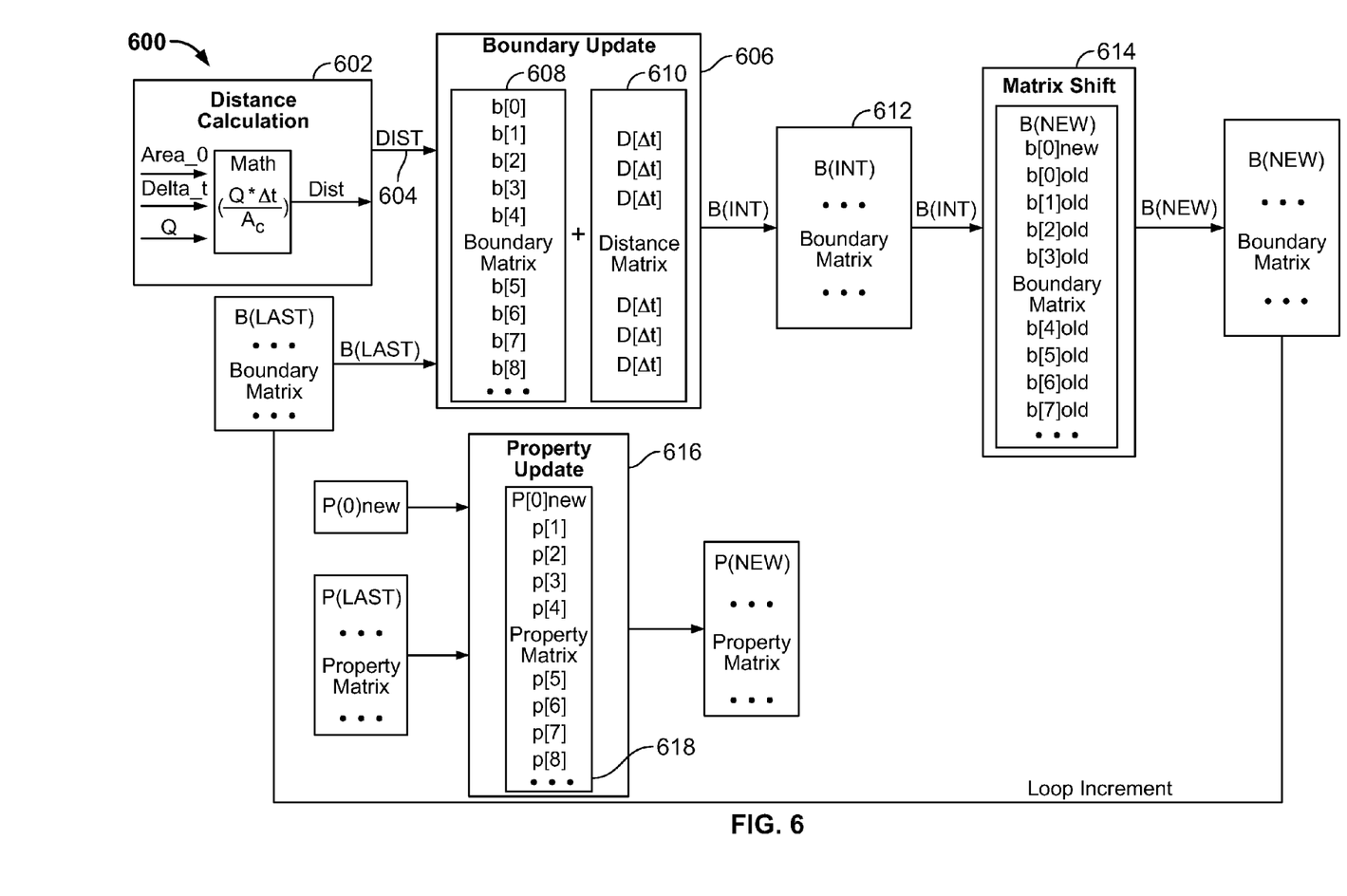
FIG. 6 is a data flow diagram 600 of a method for implementing the fluid flow model in accordance with an embodiment of the present invention.

FIG. 6 is a data flow diagram 600 of a method for implementing the fluid flow model in accordance with an embodiment of the present invention. Firstly, a size of model matrices is defined to ensure the matrices are large enough to properly model all boundary elements in the system control volume. This is accomplished by determining a minimum expected volumetric flow into the control volume, and coupling the min size of the model matrices with the model time step. From equation 3 above, the minimum matrix size and model time step can be optimized to fit the specific system application. In the exemplary embodiment, the method includes a distance calculation step 602 where a distance traveled by the flow elements is determined from the volumetric flow of the fluid, Q, the cross sectional area of the pipe $A_c$, and the model time step $\Delta t$. The determined distance is transmitted 604 to a boundary update step 606. A strategy for matrix manipulation or a software loop is created to permit the model to continuously update at each time step increment. All discrete control systems run through code execution in a set control scan rate. In a turbine controller, code is typically executed from start to finish in a specified order within this scan rate. The repetitive nature of this software environment can be used to artificially loop through a flow model at a specified time step. If the control system platform can perform matrix math and manipulations in a single scan rate, a relatively less complex implementation of the fluid flow model can be utilized.

If however, the software platform cannot manipulate a matrix entirely in a single controller scan, an additional looping scheme, as described herein, is utilized to continuously update the elements in the model matrix arrays. In some digital control systems, matrix math is limited to "getting" a value out of a matrix, performing the required math, and then "putting" the value back into the matrix array. This limited matrix math restricts and complicates the implementation of matrix-based functions such as the fluid flow model. To successfully implement the fluid flow model, the repetitive nature of the controller scan is again used to loop through and update each matrix element iteratively. The minimum model time step is limited to the product of the number of elements in the model arrays times the control system scan rate.

A one dimensional boundary matrix 608 and a one-dimensional distance matrix 610 are updated during boundary update step 606. In matrix 608, b(0) represents the properties of the flow element and a corresponding D($\Delta$t) represents a distance that element has traveled down the control volume or pipe. The elements are indexed sequentially to indicate that the element is traveling through the control volume, for example, traveling through a pipe to a burner. During each scan of the controller, a flow element is updated beginning with the second to the last flow element, for example, the flow element adjacent the flow at the end of the pipe. If there are n elements, the algorithm begins updating the matrices at the n−1 element. The nth element is the element that is exiting the control volume and therefore is no longer of interest to the algorithm.

The updated boundary matrix element 612 for the current scan is transmitted to a matrix shift step 614 and is denoted as B(n−1). The B(n−1) value is shifted to the b(n) element of boundary matrix 608 and the boundary update step 606 is iteratively completed until all boundary elements have been shifted. The shifting of each element takes one controller scan such that a matrix that includes thirty elements would require 30 controller scans to implement the model of a volume of fuel traversing the modeled pipe.

The last step in the flow model iterative loop is to update 616 a fluid property matrix 618. The fluid flow model may be used to track a physical property of the fluid in real time. For example, in a gas turbine system that uses a gas fuel moisturization system, which adds water to the natural gas fuel for power augmentation. The system transitions between a dry natural gas to the moisturized fuel during the loading cycle. To avoid fluctuations in turbine power output as a result of lower heating value moist fuel, a fuel flow model is used to track the concentration of the fuel water mixture to predict the concentration of fuel being burned real-time by the gas turbine combustion system. In property matrix update 616, the current fluid property at the inlet to the control volume is inserted as the first element in property matrix array 618. The last element in property matrix array 618 is discarded in the model as having been through the model and being no longer of interest.

Figure 7:
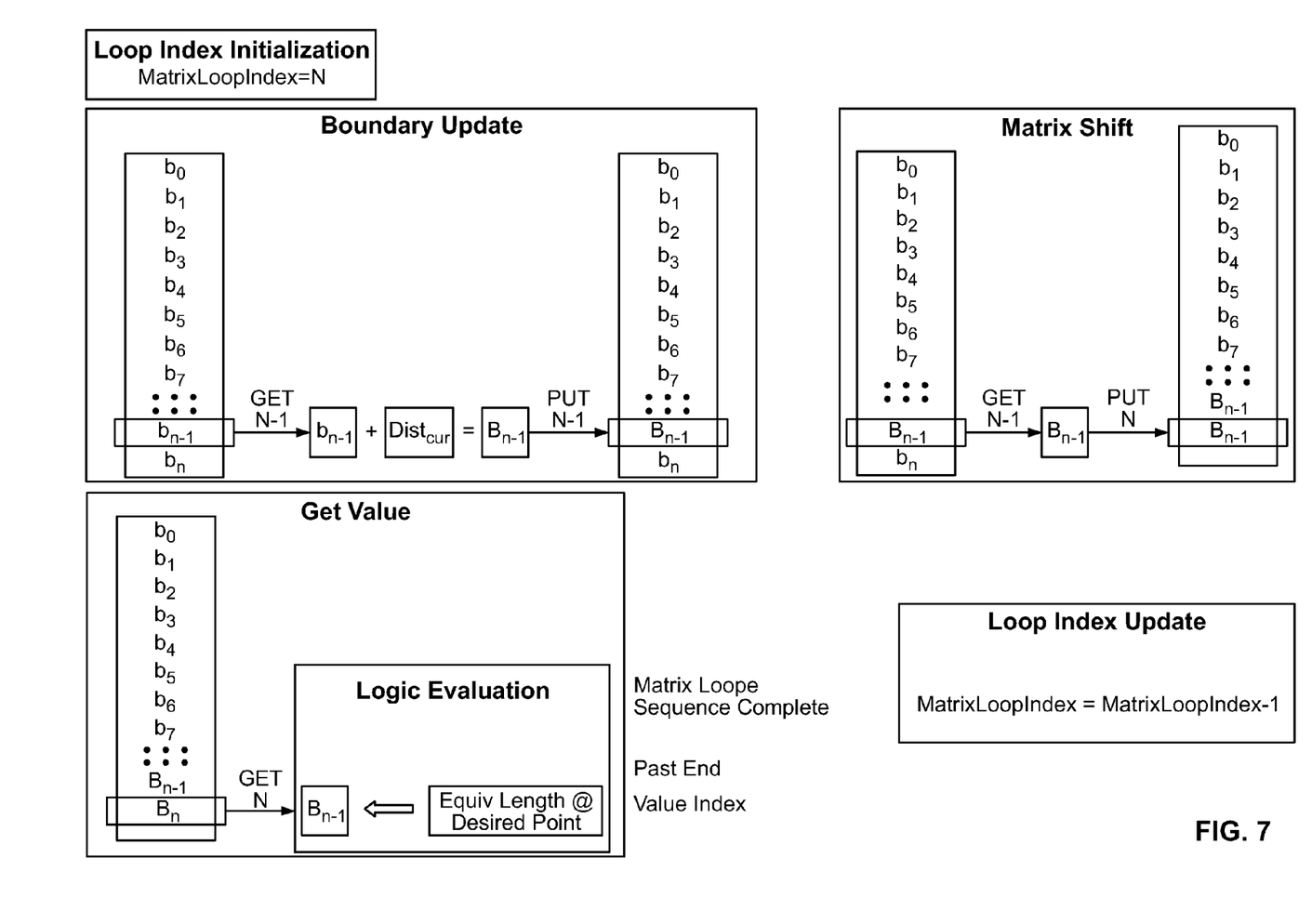
FIG. 7 is a data flow diagram that illustrates how the matrix element loop is updated for one controller scan.

FIG. 7 is a data flow diagram that illustrates how the matrix element loop is updated for one controller scan. In some applications, a constant fluid density throughout the control volume can not be accurately assumed. There are several ways to handle non-constant density fluid flows. Firstly, if there are set points in the control volume where the density change occurs, then multiple flow models can be used and stacked together in parallel to better model the density affects in the overall control volume. Alternatively, if the density changes are not discrete, an average density is determined based on the inlet and outlet fluid flow densities. If the output and input fluid densities change is relatively small, then a density correction matrix is constructed to account for these small variations according to the following equations:

$$\Delta \rho = \frac{\rho_{out} - \rho_{in}}{\# \text{ elements}}, \text{ where} \quad (6)$$

ρ=Fluid flow density, [lbs/ft3]
Δρ=Delta fluid flow density, [lbs/ft3]

$$[\rho] = \begin{bmatrix} \rho_{in} \\ \rho_{in} + \Delta\rho \\ \rho_{in} + 2\Delta\rho \\ \rho_{in} + 3\Delta\rho \\ \ldots \\ \ldots \\ \rho_{out} \end{bmatrix}, \text{ where} \quad (7)$$

[ρ]=density correction matrix
Δρ=Delta fluid flow density, [lbs/ft3]

This scheme may be applied in control systems that can perform matrix math in a single scan and therefore would not require use of the iterative loop described above.

Figure 8:
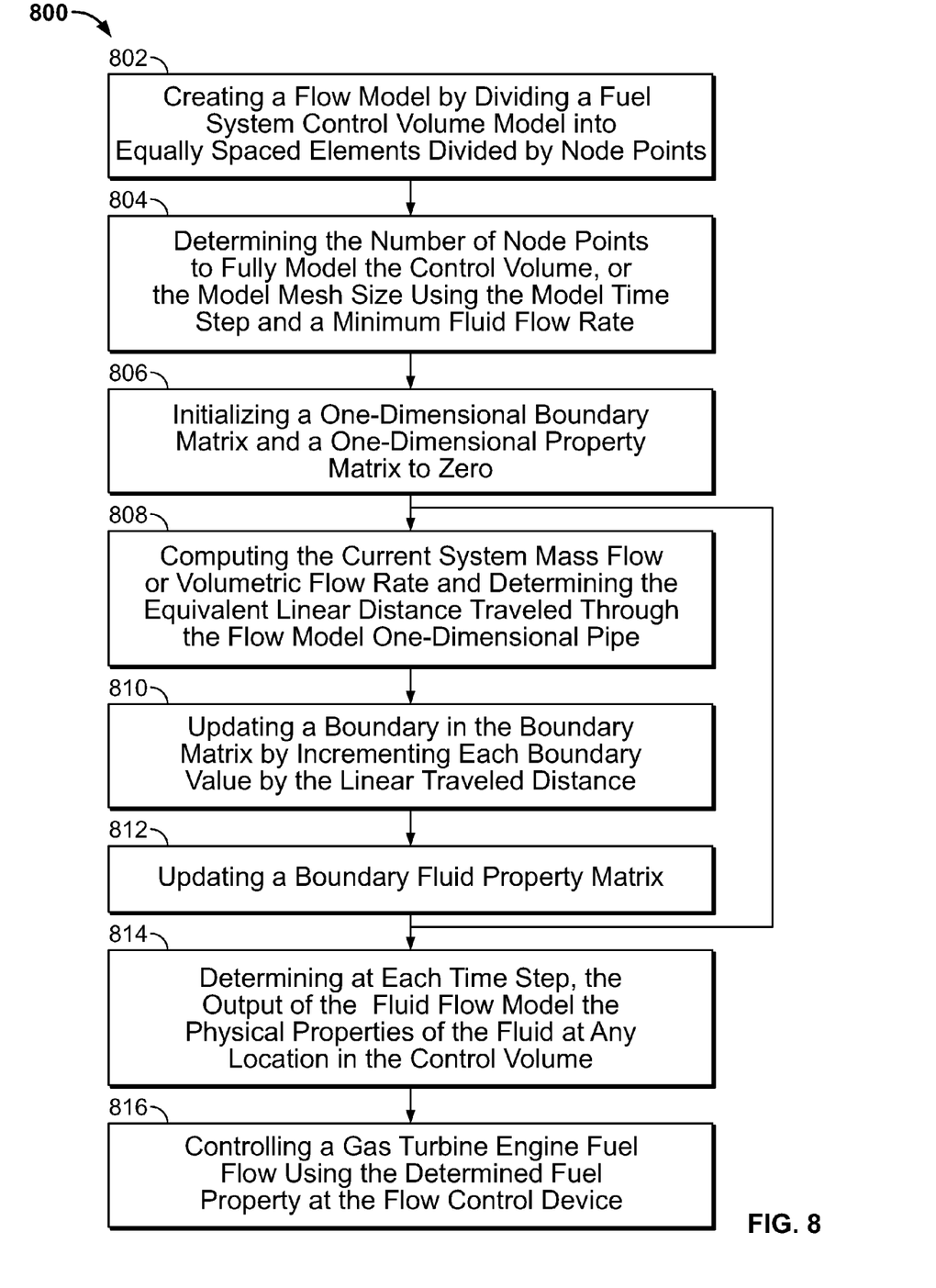
FIG. 8 is a flow chart of an exemplary method of operating a gas turbine engine in accordance with an embodiment of the present invention.

FIG. 8 is a flow chart of an exemplary method 800 of operating a gas turbine engine in accordance with an embodiment of the present invention. In the exemplary embodiment, method 800 includes creating 802 a flow model by dividing a fuel system control volume model into equally spaced elements divided by node points, determining 804 the number of node points to fully model the control volume, or the model mesh size using the model time step and a minimum fluid flow rat, and initializing 806 a one-dimensional boundary matrix and a one-dimensional property matrix to zero. Method 800 further includes iteratively computing 810 the current system mass flow or volumetric flow rate and determining the equivalent linear distance traveled through the flow model one-dimensional pipe, updating 812 a boundary in the boundary matrix by incrementing each boundary value by the linear traveled distance, and updating 814 a boundary fluid property matrix. Method 800 also includes determining 816 at each time step, the output of the fluid flow model the physical properties of the fluid at any location in the control volume and controlling 818 a gas turbine engine fuel flow using the determined fuel property at the flow control device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 29, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is actively modeling, in a digital control system, a fluid flow and composition in a control volume discretely in time where the inputs into the flow model include, fluid density, composition, flow rate and the time step or model mesh size. The model then creates a 1-D map of the system, which is updated every time step interval. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described methods and apparatus provide a cost-effective and reliable means for automatically and continuously modeling a fluid flow and applying the model in a digital control system to predicatively control the fluid flow to actual real-time operating conditions when real time measurement of at least some of the process variables is not practical or available. As a result, the methods and apparatus described herein facilitate gas turbine engine operation in a cost-effective and reliable manner.

An exemplary methods and apparatus for automatically and continuously determining the physical properties of a fuel gas at the gas control valve inlet using a flow model and determining a corresponding correction to a gas fuel flow gain are described above in detail. The apparatus illustrated is not limited to the specific embodiments described herein, but rather, components of each may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A gas turbine engine system comprising:
   a gas turbine engine comprising at least one combustor configured to receive a flow of fuel from a flow control device; and
   a fuel control system comprising:
      a piping system configured to channel the flow of fuel from a fuel source to the flow control device;
      a sensor configured to generate a signal indicative of a property of the flow of fuel wherein the property of the flow of fuel is variable over time; and
      a controller comprising a processor programmed to:
         receive the generated signal;
         using a flow model of the piping system and the received signal, iteratively track the progress of a plurality of discrete volumes flowing through the piping system, said flow model comprising a one-dimensional linear control volume divided into a plurality of control volume elements, wherein the number of control volume elements define the flow model mesh; and
         control the flow of fuel using the flow control devices.

2. A gas turbine engine system in accordance with claim 1 wherein the number of control volume elements in the one-dimensional linear control volume is determined using:

Elements=$(V_{tot}/Q_{min}*\Delta t)$, where $Q_{min}$=Min possible volumetric flow rate of the fluid, [ft3/sec]
   $V_{tot}$=Total control system volume, [ft3]
   $\Delta t$=Model time step, [sec].

3. A gas turbine engine system in accordance with claim 1 wherein said control volume elements each correspond to a respective element in a one dimensional array.

4. A gas turbine engine system in accordance with claim 1 wherein said processor is further programmed to determine a linear distance traveled by the control volume elements during a time step of the flow model using a volumetric flow rate of the flow of fuel at the time step, the cross-sectional area of the piping system, and the flow model time step.

5. A gas turbine engine system in accordance with claim 1 wherein said flow model comprises a one-dimensional matrix wherein each matrix element includes a property of the corresponding control volume element.

6. A gas turbine engine system in accordance with claim 1 wherein said processor is further programmed to update a single element of the one dimensional array during each scan of the controller.

7. A gas turbine engine system in accordance with claim 1 wherein the processor is further programmed to determine a physical property of the flow of fuel automatically at each model time step.

8. A gas turbine engine system in accordance with claim 1 wherein the physical property of the flow of fuel comprises a moisture content of the fuel.

9. A gas turbine engine system in accordance with claim 1 wherein the processor is further programmed to maintain a boundary of each control volume element using a linear distance traveled of the element through the flow model.

10. A computer-implemented method of operating a gas turbine engine having a fuel control system including a piping system and a fuel flow control device, said method comprising:
    receiving a signal indicative of a property of a flow of fuel at an inlet to the piping system;
    modeling at least a portion of the piping system using a one-dimensional matrix divided into a plurality of control volume elements, wherein the number of control volume elements define the flow model mesh;
    determining a property of the flow of fuel at the flow control device using the received signal and the model; and
    automatically controlling at least one of a flow of fuel and a fuel split using the determined property.

11. A method in accordance with claim 10 wherein modeling at least a portion of the piping system comprises dividing the piping system into a plurality of control volume elements.

12. A method in accordance with claim 11 wherein modeling at least a portion of the piping system comprises:
    determining a linear distance traveled by the control volume elements during a time step of the flow model using a volumetric flow rate of the flow of fuel at the time step, the cross-sectional area of the piping system, and the flow model time step;
    updating a one-dimensional boundary matrix wherein each boundary value is incremented by the determined linear distance traveled;
    shifting each element of the boundary matrix by one place in the matrix, the shifting simulating the corresponding control volume element moving though the piping system;
    updating a fluid property matrix such that a determined property of the flow of fluid is tracked through the piping system in real-time, wherein a single element of each matrix is updated in a single scan of the computer;
    controlling the flow of fuel using the updated matrices.

13. A method in accordance with claim 10 modeling at least a portion of the piping system comprises tracking the progress of a discrete volume of fuel through the piping system using one or more matrices that are iteratively updated during each scan of the computer.

14. A fuel control system comprising:
    a fuel inlet configured to admit a flow of fuel into the fuel control system;
    a fuel piping system coupled in flow communication with said fuel inlet;
    at least one flow control device configured to modulate flow to one or more injection points in a fuel control system load, said at least one flow control device coupled in flow communication with said fuel inlet through said fuel piping system;
    an input device configured to transmit a signal indicative of a property of a flow of fuel entering said fuel inlet; and
    a controller programmed to:
       scan a plurality of logic circuits at a predetermined scan rate;
       receive a signal from the input device indicative of a property of the flow of fuel;

using a flow model comprising a plurality of one-dimensional matrices and the transmitted signal, track the progress of the flow of fuel through the fuel piping system in real-time, said flow model comprising a one-dimensional linear control volume divided into a plurality of control volume elements, wherein the number of control volume elements define the flow model mesh; and automatically control at least one of the low of fuel and a fuel split using the tracked flow of fuel to facilitate permitting a relatively large variation in the fuel property.

15. A fuel control system in accordance with claim 14 wherein said plurality of one-dimensional matrices comprises a distance matrix, boundary matrix, and a property matrix.

16. A fuel control system in accordance with claim 15 wherein said controller is further configured to update said boundary matrix after a predetermined time step, the time step representing a linear distance the flow of fuel has traveled in the piping system, each element of the boundary matrix is shifted to a next sequential element and a boundary value in the shifted element is incremented by the linear traveled distance.

17. A fuel control system in accordance with claim 15 wherein said controller is further configured to update said property matrix after a predetermined time step, the time step representing a linear distance the flow of fuel has traveled in the piping system, each element of the property matrix is shifted to a next sequential element and a current fuel property at the fuel inlet is inserted into the first element in the property matrix.

18. A fuel control system in accordance with claim 14 wherein said controller is further programmed to update the value of a single element in each matrix during each scan of the controller.

19. A fuel control system in accordance with claim 14 wherein said controller is further programmed to initialize each matrix containing n elements, the controller updating each matrix starting at the n−1 element and iteratively progressing to the first element.

* * * * *